United States Patent
Fujiki et al.

(10) Patent No.: US 7,309,465 B2
(45) Date of Patent: Dec. 18, 2007

(54) SINTERED SPROCKET FOR SILENT CHAIN AND PRODUCTION METHOD THEREFOR

(75) Inventors: Akira Fujiki, Yokohama (JP); Yukihiro Maekawa, Yokohama (JP); Yutaka Mabuchi, Yokohama (JP); Takashi Murata, Yokohama (JP); Takashi Suzuki, Matsudo (JP); Jyun-ichi Yamada, Matsudo (JP); Tadayuki Tsutsui, Matsudo (JP); Kei Ishii, Matsudo (JP)

(73) Assignees: Nissan Motor Co., Ltd., Kanagawa (JP); Hitachi Powdered Metals Co., Ltd., Chiba (JP)

( * ) Notice: Subject to any disclaimer, the term of this patent is extended or adjusted under 35 U.S.C. 154(b) by 0 days.

(21) Appl. No.: 11/397,702

(22) Filed: Apr. 5, 2006

(65) Prior Publication Data

US 2006/0171838 A1    Aug. 3, 2006

Related U.S. Application Data

(62) Division of application No. 10/883,721, filed on Jul. 6, 2004, now abandoned.

(30) Foreign Application Priority Data

Jul. 22, 2003    (JP)    ............................. 2003-277289

(51) Int. Cl.
*B22F 3/12* (2006.01)
*B22F 5/08* (2006.01)

(52) U.S. Cl. ............................. 419/11; 419/26; 419/29; 419/38; 419/39

(58) Field of Classification Search .................. 419/11, 419/29, 32, 39, 26, 38
See application file for complete search history.

(56) References Cited

U.S. PATENT DOCUMENTS

| 5,308,702 | A | * | 5/1994 | Furukimi et al. ........... 428/403 |
| 5,599,377 | A |   | 2/1997 | Uenosono et al. |
| 5,682,588 | A | * | 10/1997 | Tsutsui et al. ................. 419/11 |
| 5,711,187 | A |   | 1/1998 | Cole et al. |
| 6,332,904 | B1 |  | 12/2001 | Fujiki et al. |
| 6,338,747 | B1 |  | 1/2002 | Kosco |
| 6,488,736 | B2 |  | 12/2002 | Ueda et al. |
| 2003/0033901 | A1 |  | 2/2003 | Sugaya et al. |
| 2003/0047032 | A1 |  | 3/2003 | Newman et al. |
| 2003/0228949 | A1 |  | 12/2003 | Okabe et al. |

FOREIGN PATENT DOCUMENTS

| EP | 1 273 769 A2 | 1/2003 |
| JP | A-2001-295915 | 10/2001 |
| JP | A-2002-129295 | 5/2002 |
| WO | WO 93/24260 | 12/1993 |

* cited by examiner

*Primary Examiner*—Roy King
*Assistant Examiner*—Ngoclan T. Mai
(74) *Attorney, Agent, or Firm*—Oliff & Berridge, PLC

(57) ABSTRACT

A sintered sprocket for a silent chain is obtained from a material with few addition elements by a simple densifying method. The sintered sprocket is made of an ferrous material having an ovarall composition containing Cu at 1 to 2%, C at 0.5 to 0.8%, Mn as an inevitable impurity at 0.10% or less, and balance of Fe and other inevitable impurities by mass and has a density of 7.1 $Mg/m^3$ or higher, 65 HRA or higher as a hardness in the gear teeth, and a martensite, sorbite, bainite, or their mixed structure as a cross-sectional microscopic structure in at least the gear teeth and the peripheral area of the gear teeth.

2 Claims, No Drawings

SINTERED SPROCKET FOR SILENT CHAIN AND PRODUCTION METHOD THEREFOR

This is a Division of application Ser. No. 10/883,721 filed Jul. 6, 2004 now abandoned. The disclosure of the prior application is hereby incorporated by reference herein in its entirety.

BACKGROUND OF THE INVENTION

1. Field of the Invention

The invention relates to a sintered sprocket to be used for a sprocket of a cam shaft timing chain of an automobile and to a production method therefor.

2. Related Art

As such a sprocket, those formed into sprocket members by forging, finished by machining, and being case hardened and tempered can be exemplified. Also, to produce sintered sprockets by powder metallurgy technique for easy forming, techniques of producing sprockets made of ferrous materials containing Ni, Mo, Cu and C by warm-compacting a powder mixture to a relatively high density, sintering the green compacts, case hardening or induction hardening the sintered bodies, and then tempering the obtained bodies have been proposed (reference to Japanese Patent Application Laid-Open No. 2001-295915, page 2; hereinafter referred to as Patent Document No. 1). Furthermore, techniques involving densifying the gear teeth of sintered bodies made of ferrous materials with similar compositions by forming by rolling and then case hardening and tempering have been proposed (reference to Japanese Patent Application Laid-Open No. 2002-129295, page 2; hereinafter referred to as Patent Document No. 2).

Since a sprocket for a silent chain has a structure of interlocking gears and transmitting the rotation by the interlocking of the gears, as compared with that of a common sprocket for a roller chain, the interlocking contact pressure of the sprocket for a silent chain is high. Therefore, the sprocket for a silent chain is required to have a high density in the gears as compared with that of a sprocket for a roller chain and also to have a high hardness by hardening. The sintered sprockets described in the above-mentioned Patent Documents Nos. 1 and 2 are obtained by means of adding Ni, Mo, and Cu for increasing the material strength and hardenability, increasing the density by warm-compacting and forming by rolling, and accordingly improving the wear resistance and the fatigue strength. Accordingly, in terms of the production cost and the process simplification, it has been required to develop a technique of producing a sprocket by using a material containing fewer addition elements and employing a simple densifying means.

SUMMARY OF THE INVENTION

The invention was made under the above-mentioned circumstances and aims to provide a sintered sprocket for a silent chain by using a material containing a few addition elements and employing a simple densifying means and a method for producing such a sintered sprocket for a silent chain.

The sintered sprocket for a silent chain of the invention is produced from an atomized iron powder with a good compressibility and having a simple composition containing Cu and C so as to satisfy the above required properties and characteristics by densifying essential parts, without employing warm-compacting or forming by rolling, by a common powder compacting and sintering method and hardening and tempering the essential parts. That is, the sintered sprocket for a silent chain of the invention, as described in a first aspect of the invention, is made of an iron alloy having an overall composition containing Cu at 1 to 2%, C at 0.5 to 0.8%, Mn as an inevitable impurity at 0.10% or less, and the balance of Fe and other inevitable impurities, has a density of 7.1 $Mg/m^3$ or higher, HRA 65 or higher as a hardness in the gear teeth, and a martensite, sorbite, bainite, or their mixed structure as a cross-sectional microscopic structure in at least the gear teeth and the peripheral area of the gear teeth.

With respect to such a sintered sprocket for a silent chain, as described in a second aspect of the invention, it is desirable that the density of the gear teeth and peripheral parts of the gear teeth be 7.1 $Mg/m^3$ or higher and that the density of other parts be lower than that of the gear teeth and peripheral parts of the gear teeth and be 6.6 $Mg/m^3$ or higher.

The production method for the sintered sprocket for a silent chain of the invention, as described in a third aspect of the invention, involves compacting a powder mixture containing an atomized iron powder, a Cu powder at 1 to 2% by mass in the entire composition, a graphite powder at 0.6 to 1.0% by mass, and a lubricant powder at 1% by mass or less into a sprocket shape having a density of 7.1 $Mg/m^3$ or higher at least in the gear teeth and peripheral parts of the gear teeth; sintering the green compact in a non-oxidizing gas atmosphere; and hardening and tempering at least the gear teeth of the sintered body.

In the production method for such a sintered sprocket for a silent chain, it is preferable, as described in a fourth aspect of the invention, that the above-mentioned atomized iron powder have a green density of 7.05 $Mg/m^3$ or higher in the case in which the powder mixed with a zinc stearate powder of 0.75% by mass is compacted by a pressure of 490.3 MPa and it is also preferable, as described in a fifth aspect of the invention, that the composition of the above-mentioned atomized iron powder contains Mn at 0.10% by mass or less and O (oxygen) at 0.10% by mass or less as inevitable impurities.

EMBODIMENTS OF THE INVENTION

Hereinafter, the embodiments of the invention will be described.

(1) Composition of the Sintered Alloy

As the sintered alloy, a common Fe—Cu—C type alloy will be used. In consideration of the strength and alteration of the dimensional change of a sintered body, it is preferable to adjust the contents of Cu at 1 to 2% by mass and C at 0.5 to 0.8% by mass and more preferably Cu at 1.5% by mass and C (bonding carbon) at 0.7% by mass.

(2) Iron Powder to Be Used

The iron powder to be used for the sintered sprocket is an atomized iron powder and among a variety of commercialized atomized iron powders, those mixed with 0.75% zinc stearate powder and having a compressibility so as to have a density of 7.05 $Mg/m^3$ or higher in the case in which they are compacted by a pressure of 490.3 MPa may be mentioned. In the case of common atomized iron powders, the density of the green compacts obtained in the above-mentioned compacting manner becomes 7.0 $Mg/m^3$ or lower, and therefore, they are not preferable.

In such atomized iron powders, the content of Mn among the inevitable impurities in the iron powders is 0.10% by mass or less and the content of O (oxygen) is 0.10% by mass or less. In the case of common atomized iron powders, the content of Mn is 0.14 to 0.20% by mass and the content of O (oxygen) is 0.12 to 0.25% by mass.

With respect to other inevitable impurities, there is no considerably significant difference observed between the atomized iron powders to be used for the embodiments and common atomized iron powders, and the slight difference is as follows: C of 0.001 to 0.005%, Si of 0.01 to 0.02%, P of 0.02% or less, S of 0.01% or less, Cu of 0.01%, Ni of 0.01 to 0.03%, and Cr of 0.01%.

With respect to the cross section hardness of an iron powder, the average value of an iron powder to be used for the embodiments of the invention is lower and the maximum value is about 110 HV, so that it cannot be said that there is a significant difference from the cross section hardness of a common atomized iron powder. Furthermore, from the cross section microscopic structures of the atomized iron powders, there is no considerable difference found in the size of crystal grains. However, in the case of etching with nital, the common atomized iron powders are etched at a high rate at the crystal grain faces, and on the other hand, the atomized iron powders to be used for the invention are hardly etched.

(3) Powder Mixture

The powder mixture to be compacted is obtained by mixing prescribed amounts of a copper powder, a graphite powder, and a common lubricant powder such as zinc stearate powder with the above-mentioned atomized iron powder.

The similar types of a copper powder and a graphite powder to those conventionally used for the production of iron-based sintered alloys may be used. The copper powder contains 60 to 90% by mass of copper grains under 350 mesh.

The content of the lubricant added to the powder mixture is 1% by mass or less. The theoretical density of the powder mixture containing the copper powder 1.5% by mass and the graphite powder at 0.8% by mass in the iron powder is 7.72 $Mg/m^3$ in the case in which no zinc stearate is added and 7.30 $Mg/m^3$ in the case in which 1% by mass of zinc stearate is added. Therefore, in the case a higher density is desired, the content of the lubricant should be set to be less. However, in the case in which the content of the lubricant is very low, the pressure of ejecting a green compact from a die becomes high, and accordingly the content is preferably adjusted to be 0.4% or higher by mass.

(4) Compacting Powder

The powder compacting is generally performed by a die. The green density is adjusted to be 7.1 $Mg/m^3$ or more in the gear teeth and in the peripheral parts of the gear teeth. Since it is desirable that the mechanical strength and the contact fatigue strength be high in the gear teeth, the density is more preferably adjusted to be about 7.3 $Mg/m^3$.

On the other hand, the parts other than the gear teeth and the peripheral parts of the gear teeth may have a density similar to that of the gear teeth, and if they have sufficient strength required for common mechanical elements, they can perform their functions sufficiently. Therefore, the density of these parts may be sufficiently 6.6 $Mg/m^3$ or higher. In general, if the density is lower, the amount of the raw material to be consumed is less and the product can be more lightweight and the vibration damping capacity is increased. Furthermore, the die life is prolonged more than if the density were increased more only in the needed parts and that results in greater economy, saves energy, and reduces material consumption, and is advantageous in terms of environmental conservation. For example, in a case of compacting a member with a size of an inner diameter of 20 mm, an outer diameter of 80 mm, and a thickness of 8 mm close to those of an actual sprocket, if the density of the 7.5 mm thick outer circumferential region covering from the outer circumference toward the center is adjusted to be 7.1 $Mg/m^3$ and the density of other parts is adjusted to be 6.8 $Mg/m^3$, the green compact weight is 7.2 g less than that if the overall density were adjusted to be 7.1 $Mg/m^3$.

In the case in which the density of the outer circumferential parts including the gear teeth is made higher and the density of other parts is made lower, it is advantageous to employ a means of changing the amount of the powder to be filled by operating a punch of a die.

The powder mixture of the invention is provided with an excellent compressibility as compared with that of a conventional powder mixture. This is due to, as described above, the quality of the atomized iron powder being different. In the case of a powder mixture containing an iron powder, a copper powder at 1.5% by mass, a graphite powder at 0.8% by mass, and a zinc stearate at 0.5% by mass, the compacting pressure is about 500 MPa to obtain the green density 7.1 $Mg/m^3$. On the other hand, in the case of a powder mixture using a conventional atomized iron powder, the above-mentioned compacting pressure is about 600 MPa and therefore a similar density can be obtained at a pressure lower by 100 MPa. Incidentally, if the powder mixture of the invention is used for compacting by the same pressure of 600 Ma, a density of about 7.2 $Mg/m^3$ can be obtained.

(5) Sintering

The sintering can be performed in common conditions. As the sintering atmosphere, a common non-oxidizing gas atmosphere of nitrogen gas, a nitrogen-hydrogen gas, or a converted butane gas can be employed. The sintering temperature can be adjusted to be 1,100 to 1,150° C. The sintered body has a iron-based matrix in which 1 to 2% by mass of Cu is almost all dispersed and the structure is a pearlitic structure containing 0.5 to 0.8% by mass of bonding carbon amount. The physical properties of the sintered body are as follows: the surface hardness is about 82 HRB, the tensile strength is about 550 MPa, and the elongation about 3.5% in the case the density is 7.1 $Mg/m^3$.

(6) Additional Pretreatment

Furthermore, the sintered body may be subjected to sizing or cutting processes. However since the sizing increases the production cost, it is therefore desirable not to employ the sizing, if possible. To obtain an excellent axial hole precision and end face precision, it is desireable to perform cutting processes.

(7) Hardening (Quenching and Tempering)

The quenching may be performed by a method for heating the entire body and then quenching it or a method for heating the gear teeth in the outer circumference and their peripheral parts by high frequency heating and then quenching these parts. In the case in which a key way exists in the axial hole of the sprocket, it is possible that no desirable size precision can be obtained owing to dimensional change by the former hardening method, and therefore the latter method is preferably employed. With respect to the former hardening method, a common case hardening can be employed. In such a case, the carbon amount of the sintered body is adjusted to be slightly less and the carbon amount in the material surface can be increased by the carburization in the hardening step. The tempering can be performed at a temperature of around 180° C.

Furthermore, the surface hardness of the gear teeth is adjusted to be 65 HRA or higher to ensure the wear resistance. To do so, in the case in which the density is about 7.1 Mg/m$^3$, the heat treatment conditions are set so as to adjust the cross sectional micro hardness of the iron alloy matrix to be about 650 HV or higher in at least 0.2 mm depth from the gear surface. The physical properties of the heat treated product are as follows: the tensile strength is about 1,110 MPa and the elongation about 0.8% in the case in which the density is about 7.1 Mg/m$^3$.

(8) Additional Step

The heat treated product can be used without any additional treatment. If shot-peening is performed for at least gear teeth and their peripheral parts, the fatigue strength in their surface can be improved to yield more excellent fatigue strength.

EXAMPLES

Hereinafter, the invention will be described in more detail along with Examples.

As raw material powders, three types of atomized iron powders, electrolytic copper powder, a graphite powder, and a zinc stearate powder were prepared. The iron powders employed were an atomized iron powder A (trade name: Atomel 300 M) manufactured by Kobe Steel, Ltd. as a general iron powder to be used conventionally for producing an iron sintered product such as a gear or the like; an atomized iron powder B (trade name: ABC 100-30) manufactured by Hoeganaes AB. and an atomized iron powder C (trade name: Atomel 300 NH) manufactured by Kobe Steel, Ltd. as iron powders to be used for the invention and an electrolytic copper powder (trade name: CE 15) manufactured by Fukuda Metal Foil and Powder Co., Ltd., was used.

The main impurities, the apparent density, the grain size distribution, and the compressibility of the atomized iron powders are as shown in Table 1. The particle size distribution was calculated by carrying out a sieving analysis test. The compressibility is evaluated on the basis of the density of a powder containing an iron powder and 0.75% by mass of zinc stearate and compacted at 490.3 MPa.

As is clear from Table 1, the contents of chemical components, Mn and O, were small in the iron powder B and the iron powder C. With respect to the grain distribution, the content of the coarse grains larger than 150 µm was relatively high and the compressibility was higher than 7.05 Mg/m$^3$.

TABLE 1

| | | Atomized iron powder | | |
|---|---|---|---|---|
| | | A | B | C |
| Trade name of iron power | | Atomel 300M | ABC 100 · 30 | Atomel 300NH |
| Chemical | C | 0.001 | 0.001 | 0.001 |
| components | Si | 0.02 | 0.01 | 0.02 |
| (mass %) | Mn | 0.18 | 0.02 | 0.09 |
| | O | 0.110 | 0.035 | 0.050 |
| Apparent density (Mg/m$^3$) | | 3.0 | 3.0 | 3.0 |
| Grain size | +180 µm | Micro | 2 | 5 |
| distribution | +150 µm | 2 | 8 | 8 |
| (%) | +106 µm | 16 | 20 | 19 |
| | +75 µm | 24 | 22 | 23 |
| | +45 µm | 28 | 25 | 27 |
| | −45 µm | 30 | 23 | 18 |
| Compressibility (Mg/m$^3$) | | 6.95 | 7.06 | 7.08 |

Next, the respective three types of the atomized iron powders were mixed independently with a copper powder at 1.5% by mass, a graphite powder at 0.8% by mass, and zinc stearate at 0.4% or 0.8% by mass as a lubricant to obtain powder mixtures. The compressibilities (Mg/m$^3$) of these powder mixtures is shown in Table 2. The compressibilities were in the case in which the diameter of the respective test specimens was adjusted to be 11.3 mm. The respective powder mixtures are shown as A, B, and C correspond to the types of the atomized iron powders shown in Table 1. As is clear from Table 2, the densities of the iron powder B and the iron powder C were high. Furthermore, in the case of the same iron powder, the density was higher if the content of the lubricant is less. However, the ejection pressure at the time of ejecting from the die was about 2.8% of the compaction pressure and it became higher if the content of the lubricant was less.

TABLE 2

| Variety of powder mixture | Amount of lubricant (%) | Compacting pressure (MPa) | | | |
|---|---|---|---|---|---|
| | | 490 | 588 | 686 | 784 |
| A | 0.4 | 7.00 | 7.10 | 7.20 | 7.26 |
| B | 0.4 | 7.07 | 7.17 | 7.25 | 7.30 |
| C | 0.4 | 7.13 | 7.21 | 7.28 | 7.32 |
| A | 0.8 | 6.05 | 7.03 | 7.11 | 7.15 |
| B | 0.8 | 7.02 | 7.10 | 7.16 | 7.20 |
| C | 0.8 | 7.04 | 7.12 | 7.17 | 7.20 |

Furthermore, a sprocket was produced from the powder B containing 0.4% by mass of the lubricant. The sprocket had 44 gear teeth, a gear tip diameter of 89 mm, an inner diameter of 19 mm, an average thickness of 8.5 mm and was formed into a shape having steps in the peripheral part of the gears and in the peripheral part of the inner diameter and a key way with a width of 6 mm and a depth of 10 mm from the inner diameter part toward the outer circumference. As the die assembly, a common die apparatus composed of a die, a core rod, and a pair of upper and lower punches divided into inner and outer punches was used. The partial density of the sprocket green compact was adjusted to be 7.15 Mg/m$^3$ in the gear teeth and the area in the outer circumferential side from the center with about 80 mm diameter and to be 6.8 Mg/m$^3$ in the inner side from the center with about 80 mm diameter.

The green compact was sintered at temperature of 1,120° C. in a hydrogen-nitrogen atmosphere. The density of the gear teeth of the sintered body was 7.11 Mg/m$^3$ and the bonding carbon content was found to be 0.7% from the microscopic structure of the cross-section.

The sintered body was oil quenched after being heated for a prescribed period by a high frequency heating apparatus and tempered at 180° C. The surface hardness of the gear teeth was 68 to 70 HRA. The microscopic structure of the cross-section was found containing mainly martensite in the gear teeth and gradually changing to a region comprising finely deformed troostite and pearlite toward the axial center and finally to a pearlitic structure in the sintered state.

Finally, the inner diameter part of the heat treated product was subjected to the machining in a prescribed size so as to fit the inner diameter part of the heat treated product with an axis and accordingly complete the sintered sprocket. In addition, in this experiment, the gear teeth had a structure of mainly martensite; however, in the case in which the conditions of the tempering temperature and the temperature duration were changed, a mixed structure containing sorbite, bainite, or either of them may be formed in some cases.

A sintered sprocket for comparison was that described in Japanese Patent Application Laid-Open No. 2001-295915. More particularly, the sprocket was produced by mixing an iron alloy powder containing Ni at 4% by mass, Mo at 0.5% by mass, and Cu at 1.5% by mass, which were respectively diffused and joined therein, with a graphite powder and a lubricant; heating the powder mixture at 130° C.; compacting the powder mixture by the die heated to 150° C. (warm-compacting) for obtaining the sprocket-shaped green compact with a green density of 7.15 $Mg/m^3$; and then sintering the sprocket-shaped body at 1,195° C. After that, the inner diameter part of the sintered body was formed by a machining process to adjust the dimensions, and the sintered body was case hardened and tempered.

The above-mentioned sintered sprocket of Example and the sintered sprocket for comparison were mounted in gasoline engines to investigate the wear state. The driving conditions of the engines were as follows: the silent chain tension (tensile force) was 1,500 N; the engine rotation speed was 6,000 rpm; and the driving duration was 100 hours. As a result, no difference was found in the wear loss of both sprockets.

The invention claimed is:

1. A production method for a sintered sprocket for a silent chain, comprising:

preparing a mixed powder consisting of a Cu powder at 1 to 2% by mass, a graphite powder at 0.6 to 1.0% by mass, a lubricant powder at 1% or less by mass, and an atomized iron powder as balance, the atomized iron powder containing Mn at 0.10% or less by mass and O (oxygen) at 0.10% or less by mass in inevitable impurities, in the entire composition, compacting the mixed powder to form into a sprocket shape having a density of 7.1 $Mg/m^3$ or higher at least in a gear teeth and a peripheral parts of the gear teeth, thereby obtaining a green compact, sintering the green compact in a non-oxidizing gas atmosphere, thereby obtaining a sintered body, and quenching and tempering at least the gear teeth of the sintered body.

2. The production method for a sintered sprocket for a silent chain, according to claim 1, wherein a green density is 7.05 $Mg/m^3$ or higher when a zinc stearate powder of 0.75% by mass is mixed with the atomized iron powder, thereby obtaining a mixed powder, and the powder is compacted by a pressure of 490.3 MPa to form the green compact.

* * * * *